(12) United States Patent  
Pang et al.

(10) Patent No.: US 7,038,781 B2  
(45) Date of Patent: May 2, 2006

(54) TIME CORRELATION OF ULTRAFAST LASER PULSES

(75) Inventors: H. Yang Pang, San Jose, CA (US); R. Russel Austin, Half Moon Bay, CA (US)

(73) Assignee: Coherent, Inc., Santa Clara, CA (US)

( * ) Notice: Subject to any disclaimer, the term of this patent is extended or adjusted under 35 U.S.C. 154(b) by 266 days.

(21) Appl. No.: 10/676,679

(22) Filed: Oct. 1, 2003

(65) Prior Publication Data

US 2005/0073689 A1    Apr. 7, 2005

(51) Int. Cl.  
G01B 9/02    (2006.01)

(52) U.S. Cl. .................. 356/450; 356/451; 356/484; 372/29.022

(58) Field of Classification Search ............... 356/450, 356/454, 519, 484, 451; 372/29.022  
See application file for complete search history.

(56) References Cited

U.S. PATENT DOCUMENTS

| | | | | |
|---|---|---|---|---|
| 4,896,324 A | * | 1/1990 | Ball et al. | 372/18 |
| 5,367,529 A | * | 11/1994 | Holsinger et al. | 372/30 |
| 5,754,292 A | * | 5/1998 | Kane et al. | 356/450 |
| 5,778,016 A | | 7/1998 | Sucha et al. | 372/38 |
| 5,926,492 A | | 7/1999 | Yoshida et al. | 372/6 |
| 6,819,428 B1 | * | 11/2004 | Ogawa | 356/450 |

OTHER PUBLICATIONS

J.-C. Diels et al., "Ultrafast diagnostics," *Revue Phys. Appl.*, vol. 22, Dec. 1987, pp. 1605-1611.  
C. Rullière (Ed.), book entitled *Femtosecond Laser Pulses*, Chapter 7 entitled "How to Measure the Characteristics of Laser Pulses," 1998, pp. cover, copyright page, 177-201.  
In re U.S. Appl. No. 10/219,012, filed Aug. 14, 2002, by Wyndham Robertson III, entitled: Digital Electronic Synchronization of Ultrafast Lasers, 27 pages in length.

* cited by examiner

*Primary Examiner*—Samuel A. Turner  
*Assistant Examiner*—Marissa J Detschel  
(74) *Attorney, Agent, or Firm*—Stallman & Pollock LLP (57) ABSTRACT

Time-correlation methods for determining pulse characteristics from a modelocked ultrafast laser include a cross-correlation method and an auto-correlation method. In the cross-correlation method, pulses from the laser and pulses from another modelocked laser are incident on a two-photon detector that responds when the pulses overlap in time. The lasers are synchronized to the same frequency and the phase difference between pulses from the two lasers is varied to vary the temporal pulse overlap while recording the detector response. Pulse characteristics are determined from recorded data representing the detector response as a function of phase difference. In the auto-correlation method, pulses from one laser are divided into two components. One component follows a fixed delay path before being temporally overlapped at the detector with another component that has not been delayed. The temporal overlap is varied by varying the pulse repetition frequency. Pulse characteristics are determined from recorded data representing the detector response as a function of phase difference.

17 Claims, 8 Drawing Sheets

TIME CORRELATION OF ULTRAFAST LASER PULSES

TECHNICAL FIELD OF THE INVENTION

The present invention relates generally to measuring characteristics of ultrafast laser pulses by auto-correlation and cross-correlation of pulses from modelocked ultrafast lasers. The invention relates in particular to auto and cross-correlation methods in which the temporal overlap of pulses or pulse components on a single two-photon detector is varied by varying the phase of pulse trains emitted by two lasers or the frequency of a pulse train emitted by one laser.

DISCUSSION OF BACKGROUND ART

Ultrafast lasers can deliver very short (ultrafast) pulses at relatively high pulse repetition rates. By way of example pulses may have a duration of 10 picoseconds (ps) or less at pulse repetition rates between about 75 Megahertz (MHz) and 1 Gigahertz (GHz) or greater. The pulse duration of a passively modelocked laser is determined, inter alia, by the gain-medium in the resonator and the method of passive modelocking. The pulse repetition rate of a passively modelocked laser is determined by the optical length of the resonator of the laser.

In many applications of ultrafast laser pulses such as time-resolved coherent anti-Stokes Raman spectroscopy (CARS) and CARS imaging studies, diagnosis of the ultrafast pulses, such as determination of pulse amplitude and duration, is required. As the duration of pulses decreases, conventional optical detectors such as photodiode-detectors, become less able to provide a signal that gives an accurate representation of the amplitude and duration of the pulses. Simply stated, this is because the length of time it takes a detector to respond to the pulse is greater than the duration of the pulse.

In order to avoid this problem pulse measurement techniques based on correlation of two pulses have been extensively developed. In these methods what is measured is a signal provided by observing an effect produced in a detecting medium that is produced when the medium receives two pulses simultaneously. The phase of one of the pulses is progressively changed with respect to the other. The effect to be observed (detected) is at a minimum when the pulses only just overlap in time and at a maximum when the pulses exactly overlap, i.e., are exactly in phase. Numerical analysis techniques are used to extract pulse characterization data from signals representing the magnitude of the observed effect as a function of phase.

Correlation techniques may be divided into autocorrelation techniques and cross-correlation techniques. In auto correlation the two pulses to be progressively overlapped are created by optically dividing a single pulse into two components. One of the pulse components is sent along a fixed optical path to the two-pulse detecting medium and the other is sent via another optical path of a variably different length from the length of the fixed optical path. Variation of this path length is used to vary the time between arrival of the pulse components at the detecting medium. In cross-correlation each of the two pulses is supplied by a separate laser. Pulses from one of the lasers travels to the detecting medium via a fixed path. Pulses from the other lasers travel to the detecting medium via a variable path. Methods for extracting pulse characteristics cross-correlation and auto-correlation methods are similar and are well known in the art. A summary providing examples of both techniques in provided in a book "*Femtosecond Laser Pulses—Priniciples and Experiments*", C. Rullière (Ed), pp 177–201. A detailed description of cross-correlation is provided in a paper "*Ultrafast Diagnostics*", J. C. Diels et al., Rev. Phys. Appl., 12, 1605 (1987).

Common to prior-art autocorrelation and cross correlation techniques alike is a requirement for an optical delay line of variable length. Often these delay lines are required to be relatively long, particularly for picosecond pulses. If such delay lines are used in time resolved spectroscopy studies for example 3 nanosecond (ns) correlation requires a delay line having a length of about one meter (1.0 m). The delay lines must be mechanically, precisely constructed, such that the path length can be varied without significantly varying the physical superposition of temporally superposed individual pulses or pulse components. There is a need for a correlation technique that does not require a variable optical delay line for varying the temporal superposition of pulses and preferably, does not require an optical delay line at all.

SUMMARY OF THE INVENTION

In one aspect of the present invention, a cross-correlation method for laser pulses comprises providing two repetitively pulsed laser resonators each delivering a pulse train. The pulse trains are directed such that they to spatially overlap on a detector. The detector provides a response when a pulse of one of the pulse trains temporally overlaps a pulse of the second pulse train. The detector response has a magnitude dependent on the degree of temporal overlap of the pulses.

The optical length of one of the laser resonators is varied to change the temporal overlap between the pulses. The magnitude of the response of the detector is recorded at a plurality of different degrees of temporal overlap of the pulses. Optical characteristics of the pulses can be determined from data representing the magnitude of the detector response as a function of the temporal overlap.

In another aspect of the present invention, an auto-correlation method for laser pulses comprises providing a repetitively pulsed laser resonator delivering a train of pulses having a selectively variable pulse repetition frequency. Each pulse of the pulse train is optically divided into two pulse components. Each pulse component is directed along a different-length path to the detector. The detector provides a response when a pulse component received from one of the paths temporally overlaps a pulse component received from the other pulse component on said detector. The detector response has a magnitude dependent on the degree of temporal overlap of the pulse components. The pulse repetition frequency is selectively varied while maintaining the path lengths fixed. This correspondingly varies the temporal overlap of the pulse components. The magnitude of the response of the detector at a plurality of different degrees of temporal overlap of the pulse components is recorded to provide data from which characteristics of the pulses can be determined.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
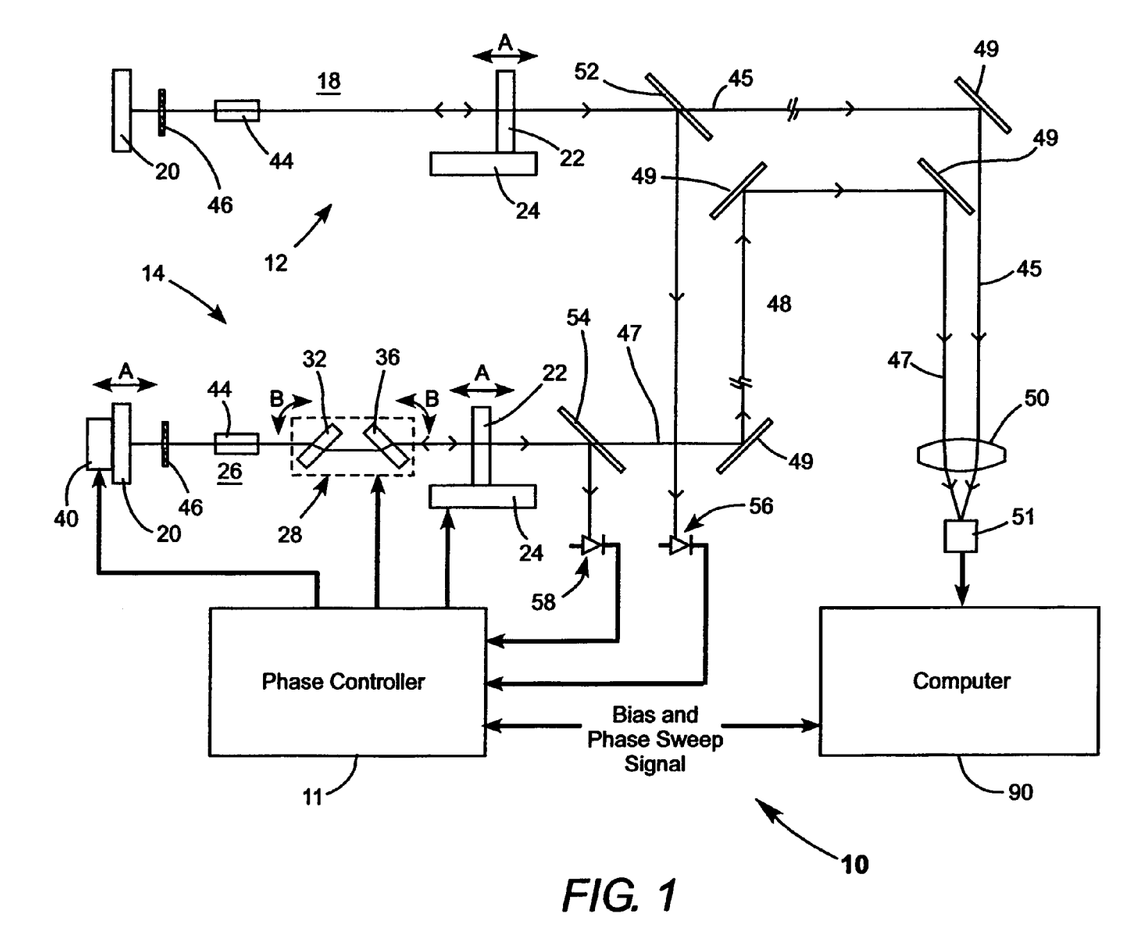
FIG. 1 schematically illustrates a preferred embodiment of apparatus for implementing a cross correlation method in accordance with the present invention including two repetitively pulsed lasers, pulses of which are directed to a single detector, with one the lasers being provided with a phase controller arranged to control one the lasers with reference to the other to provide a varying temporal overlap of pulses at the detector.
Figure 2:
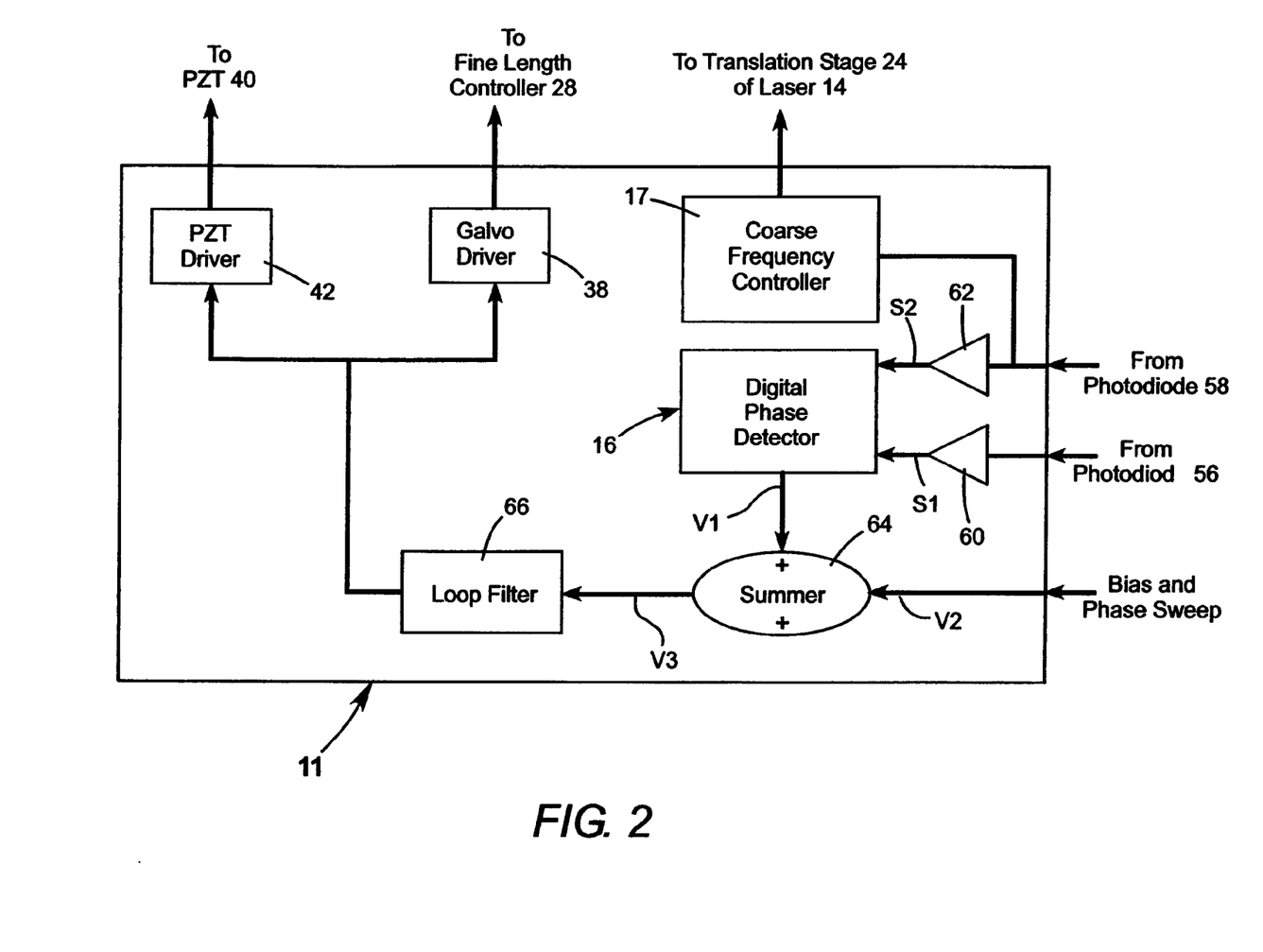
FIG. 2 is a block diagram schematically illustrating one preferred example of a phase controller suitable for use as the phase controller of FIG. 1.
Figure 3:
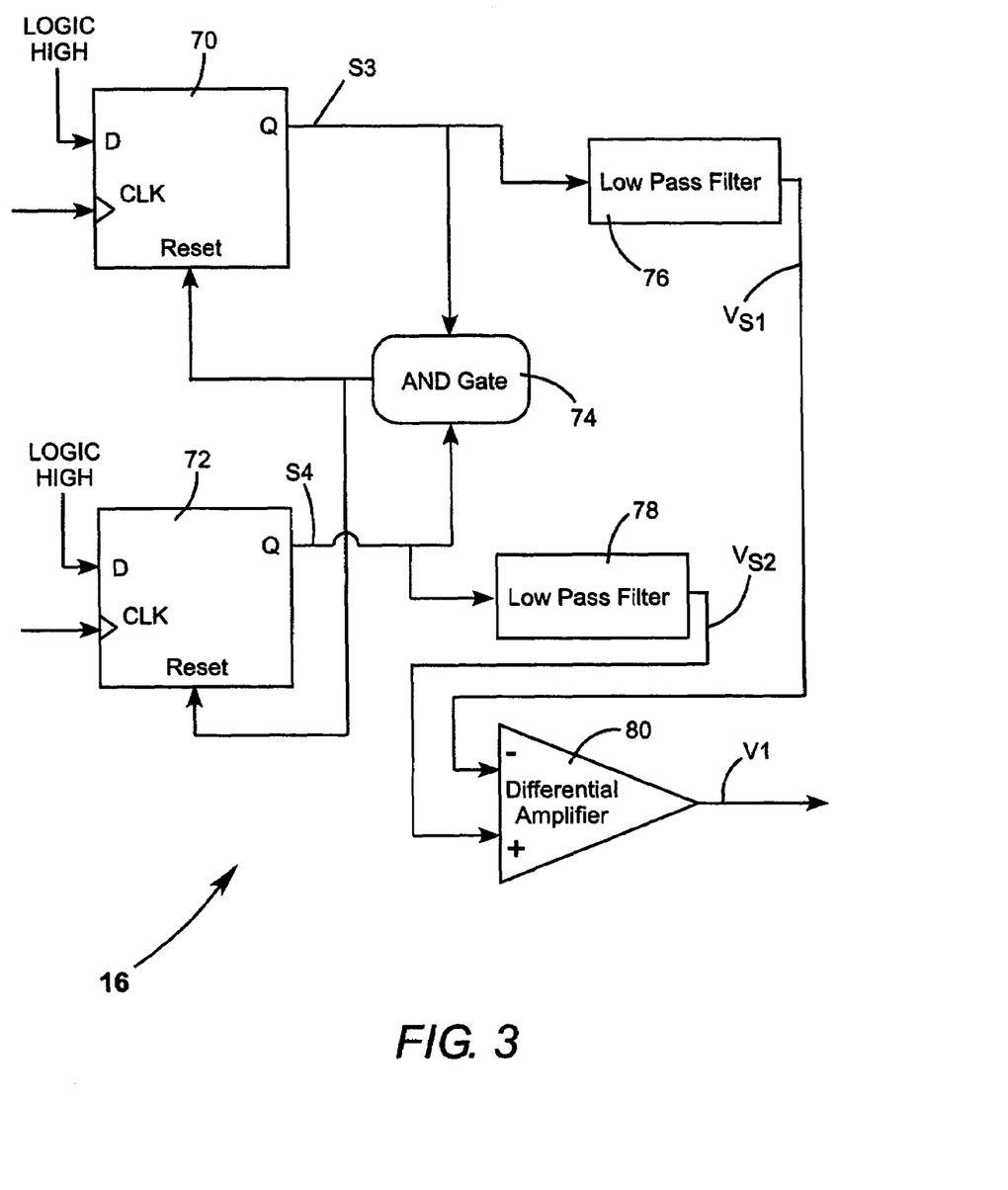
FIG. 3 schematically illustrates of one preferred arrangement of electronic circuits and their interconnection in the digital phase detector of FIG. 2, including two flip-flop circuit elements arranged to be triggered to a high logic state on receipt of a electronic pulse corresponding to a laser pulse and a logic AND gate arranged to reset both flip-flop circuits to a low logic state after each has received an electronic pulse corresponding to a laser pulse.

Turning now to the drawings, wherein like features are designated by like reference numerals, FIG. 1 schematically illustrates a preferred apparatus 10 for implementing a cross-correlation method in accordance with the present invention. Apparatus 10 includes two lasers 12 and 14, and a phase (and frequency) controller 11 for synchronizing the output of the lasers. FIG. 2 schematically illustrates the functional layout of a preferred example of a phase controller 11 including a digital phase detector 16. FIG. 3 schematically illustrates electronic circuits and their interconnection in digital phase detector 16. In FIG. 1, the paths of laser pulses in and from the lasers are designated by fine lines, and the direction of propagation of the laser pulses is indicated by open arrows. Connections between electronic circuits and electronic function blocks are indicated in FIG. 1 and FIG. 2 by bold lines, with the direction of signal transfer between the circuits and blocks indicated by solid arrows.

Laser 12 may be referred to as the master laser and includes a resonator 18 terminated by a maximally reflecting mirror 20 and a partially transmitting (outcoupling) mirror. Mirror 22 is mounted on a translation stage 24 that allows mirror 22 to be moved axially, as indicated by arrows A, for providing coarse adjustment of the optical length of the resonator, and, accordingly, coarse adjustment of the repetition-frequency of laser pulses delivered from the resonator.

Laser 14 may be referred to as the slave laser and includes a resonator 26 terminated by a maximally reflecting mirror 20 and a partially transmitting (outcoupling) mirror 22. Mirror 22 of laser 14 is also mounted on a translation stage 24 that allows mirror 22 to be moved axially for providing coarse adjustment of the resonator length. The optical length of resonator 26 is arranged to be automatically adjusted by digital phase detector 16 and associated electronic circuits and devices for synchronizing output pulse trains delivered by laser 14 with output pulse trains delivered by laser 12.

Two devices are provided for implementing automatic adjustment of the length of resonator 26. A first of these is a galvanometer arrangement 28 including two transparent plates 32 and 36 that are rotatable as indicated by arrows B. The plates are rotated toward or away from each other for respectively increasing or decreasing the resonator length. The rotational position is determined by a galvanometer driver circuit 38. Galvanometer 28 provides for medium range adjustment of the resonator length (and pulse-repetition frequency). The second length resonator-length-adjustment device is a piezoelectric transducer (PZT) 40 which positions mirror 20 of resonator 26 axially as indicated by arrows A. The axial position mirror 20 is determined by the magnitude of a voltage applied to the PZT by a driver circuit 42. PZT 40 provides for rapid-response, fine adjustment of the optical length of resonator 26. Resonators 18 and 26 each include a gain-medium 44 and an aperture 46 that works cooperatively with a Kerr effect in gain-medium 44 to provide passive modelocking of the resonators. Those skilled in the art will recognize that the terminology resonator length as used herein refers to the optical length of the resonator. The optical length may be different from the physical length due to the length and refractive index of optical components in the resonator. The optical length of the resonator can be changed by moving the mirrors, in which case the physical length is also changed or by rotating plates 32 and 36, in which case the optical length can be changed without changing the physical length.

It should be noted here that lasers 12 and 14 are depicted for simplicity of illustration, with straight resonators in a very basic form. Those skilled in the art will recognize that ultrafast lasers often have complex folded resonators and include tuning elements and elements for controlling group delay dispersion (GDD) such as prisms. A detailed discussion of such features is not necessary for understanding principles of the present invention. Accordingly such features are not described or depicted herein.

Galvanometer 28 is arranged for particular use in a straight resonator. Those skilled in that art will recognize that other galvanometer arrangements may be used in straight or folded resonators without departing from the spirit and scope of the present invention.

Output pulse trains from lasers 12 and 14 are delivered along paths 45 and 47 and are focused by a lens 50 to spatially overlap on a detector 51. Detector 51 is arranged to respond only when two pulses are incident thereon, overlapping in space and time. One preferred detector is a two-photon effect light-emitting-diode (LED) type detector available from Hamamatsu Corporation of Japan. Paths 45 and 47 may be of different optical length and include optical components such as turning mirrors 49.

In the cross-correlation method of the present invention, it is preferred that pulses traveling along each path arrive on detector 51 with the same repetition frequency and in a selectively variable phase relationship with each other. The phase relationship is varied such that pulses arrive with different degrees of temporal overlap. The magnitude of the detector output for different overlaps (phase difference between the pulses) is recorded by a data processing computer 90. The phase difference is interpreted as time. i.e., as a fraction of a pulse repetition interval to provide time versus magnitude data from which the pulse characteristics can be derived by any well know method used in prior-art, variable delay line cross-correlation techniques. The time is translated in physical movement of mirror 20 via PZT 40. The range of the phase change required to pass through a range of overlap is determined by the rate of driving the PZT. By way of example, for a 100 MHz laser cavity, a 100 picosecond sweeping range at 30 Hz can be achieved by displacement of only tens of nanometers by PZT 40. This sweeping rate enables a relatively fast data acquisition rate thereby avoiding low frequency noise interference in the data collection.

Mirror 22 of laser resonator 14 is preferably driven by a stepping motor (not shown) controlled by a frequency controller 17 in phase controller 11 (see FIG. 2), and adjusted such that lasers 12 and 14 have pulse repetition frequencies matched to within about 1.0%. This adjustment can be monitored by a pulse counter arrangement or the like (not shown) in frequency controller. This adjustment brings the repetition frequency difference of lasers 12 and 14 within a range that can be more precisely corrected by galvanometer device 28. Galvanometer device 28 automatically reduces the repetition frequency difference to within a range that can be automatically corrected by PZT-driven mirror 20 of resonator 26. A preferred method of automatically effecting these corrections (frequency and phase synchronization or matching) is set forth below with continuing with reference to FIG. 1.

A portion of pulse trains from lasers 12 and 14 is sampled by beamsplitter mirrors 52 and 54 respectively. The sampled portions are directed to photodetectors (here photodiodes) 56 and 58 respectively. The output of photodiodes 56 and 58 is communicated to digital receivers 60 and 62 respectively. Digital receivers 60 and 62 (FIG. 2) deliver a pulse at a predetermined peak logic voltage level for each electronic pulse received from the photodiodes independent of the magnitude of the received pulses. Accordingly, digital receivers 60 and 62 deliver digital signals (trains of electronic pulses all having the same peak voltage) S1 and S2 to digital phase detector 16. Signals S1 and S2 have the same repetition frequency as the pulse-repetition frequency of laser pulse trains arriving at photodiodes 56 and 58 respectively.

Digital phase detector 16 (see FIG. 2) is arranged to generate an analog voltage signal V1 from digital signals S1 and S2 using circuitry described in detail further hereinbelow. Analog voltage V1 is representative of the phase difference between signals S1 and S2 and will be essentially zero when signals S1 and S2 have the same repetition frequency and are in phase. It will be evident to one skilled in the art that, because of the above discussed frequency jitter, the length of resonator 26 will usually be in a constant state of correction. Accordingly, voltage V1 may only instantaneously be exactly zero and, when synchronization has been effected to a limiting accuracy of the inventive method and apparatus, may vary randomly with time slightly above and below zero. In this state, signal voltage V1 can be referred to as being minimized, i.e., jittering about zero.

It should be noted here that when voltage V1 is zero, this indicates that sampled pulse trains are arriving in phase, at the same frequency at photo diodes 56 and 58. Corresponding pulse trains arriving at detector 51 will have the same frequency but may be out of phase, having followed different paths of different length to the detector. In order to provide that pulses have the desired phase relationship at the detector, voltage V1 is summed with a voltage V2 in a summer circuit 64 to provide an analog voltage signal V3. Voltage V2 is selected such that V3 is minimized when pulse trains from laser 12 and 14 arrive on detector 51 with the same repetition frequency and have the desired phase relationship with each other. In this condition, of course, sample pulse trains arriving at photodetectors 58 and 56 may not be in phase, and voltage V1, correspondingly, may not be zero. Selection of V2 can be made by observing the arrival of pulses at the detector location, for example, using a phase detection arrangement similar to that described herein or by observing a phenomenon resulting from interaction of pulses with the detector.

Voltage signal V3 provides an error signal representative of a difference in frequency or desired phase. The signal is electronically filtered in a filter 66 to eliminate any high harmonic content. The filtered signal is communicated to PZT driver 42 and galvanometer driver 38. The error signal, of course, will be zero if V3 is zero. As long as V3 is not zero, galvanometer 28 or PZT 40 will adjust the length of resonator 26 to synchronize the arrival of pulses at detector 51. Depending on whether V3 is positive or negative, the resonator length will be increased or decreased.

It should be noted here that PZT 40 has a response time about 500 times faster than that of galvanometer 28. If PZT 40 reaches one or the other extreme of its range and V3 is not zero, as may happen in an initial stage of synchronization, the PZT will wait at this extreme until galvanometer 28 has adjusted the resonator length sufficiently to drive V3 to zero. Galvanometer 28 has a higher gain than PZT 40 and will tend to dominate the correction process at slow speeds leaving PZT 40 at about the midpoint of its movement range. If, subsequently, a length adjustment necessary to drive V3 to zero is within the range of PZT 40, as will typically be the case once initial synchronization has been achieved, PZT 40 will effect the length adjustment before galvanometer 28 can effectively respond.

As discussed above, an important aspect of the present invention is the generation of an analog voltage signal V1 from digital signals S1 and S2 having the pulse repetition frequency pulse trains delivered by lasers 12 and 14 respectively. Voltage V1 is zero if signals S1 and S2 have the same pulse repetition frequency and are in phase at photodiodes 56 and 58. V1 has some other positive or negative value if signals S1 and S2 have different frequencies, or have the same frequency but are out of phase at the photodiodes. A preferred circuit layout and method of operation for digital phase detector 16 is discussed below with reference to FIG. 3 and FIGS. 4A–D.

Digital phase detector 16 includes two flip-flop circuit elements (flip-flops) 70 and 72. Each flip-flop has a logic voltage (LOGIC HI) applied to a port D thereof. Signals S1 and S2 are delivered to the clock port (CLK) of flip-flops 70 and 72 respectively. In the following discussion, signal S1 and signals generated therefrom are occasionally referred to as master signals. Signal S2 and signals generated therefrom are referred to as slave signals.

In the example depicted by timing diagrams of FIGS. 4A–D, it is assumed that master and slave signals S1 and S2 have different frequencies, and slave signal S2 is leading in phase. A pulse of signal S2 triggers flip-flop 72 causing the output at port Q of the flip-flop to go to a high logic state. At a time (Ts) after flip-flop 72 has been triggered, a corresponding pulse in signal S1 triggers the output of flip-flop 70 to a high logic state. The terminology "corresponding pulses" in this description and the appended claims means a pulse in one pulse train that immediately precedes or succeeds in time a pulse in the other pulse train.

The outputs of flip-flops 70 and 72 are both connected to a logic AND-gate 74. When the output of both flip-flops is at a high logic state, the output of AND-gate 74 is asserted and the output of both flip-flops is reset to a low logic state after some minimal delay period (Td) due to response time of the logic gates. Accordingly, the output (S3) of the flip-flop 70 has a pulse width Td equal to the gate (switching) delays, whereas the output (S4) of flip-flop 72 has a pulse width Ts+Td equal to the sum of the lead-time of the slave pulse and the gate delays. Ts is variable with phase and TD is a constant dependent on the particular electronic circuits used.

Signals S3 and S4 are averaged over the period of the signal by low-pass filters 76 and 78, respectively, to provide analog voltages $V_{S1}$ and $V_{S2}$, respectively. The period of each signal is equal to the inverse of the frequency of the signal (T=1/f). The duty-cycle is equal to the pulse width times the frequency. The analog voltage delivered by each low-pass filter, accordingly, is equal to the duty-cycle times the logic peak-to-peak voltage ($V_{logic}$) plus any offset voltage ($V_{offset}$) due to emitter-coupled logic (ECL) logic levels. Voltages $V_{S1}$ and $V_{S2}$ can be defined as indicated in equations (1) and (2) below.

$$V_{S1} = V_{logic} * f_{S1} * (Ts+Td) + V_{offset} \quad (1)$$

$$V_{S2} = V_{logic} * f_{S2} * Td + V_{offset} \quad (2)$$

Voltages $V_{S1}$ and $V_{S2}$ are subtracted in a differential amplifier 80, the output of which is voltage V1 discussed above with reference to FIG. 2.

Figure 4A:
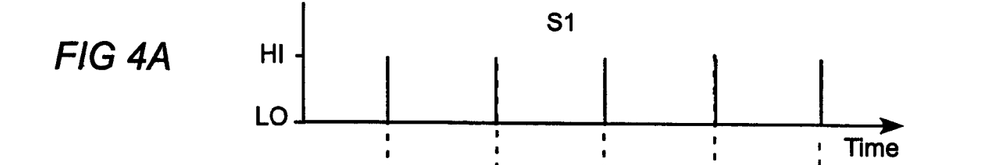
FIGS. 4A–D are timing diagrams indicating the form of output pulse trains from the flip-flop circuits of FIG. 3 in response to the flip-flop circuits receiving electronic pulse trains of different frequency.
Figure 4B:
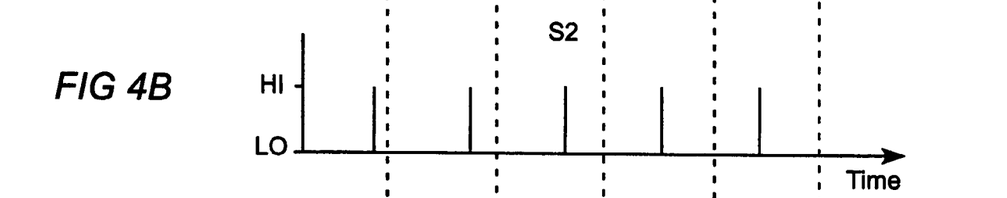
Figure 4C:
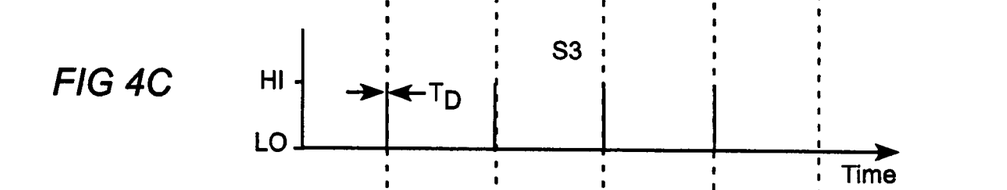
Figure 4D:
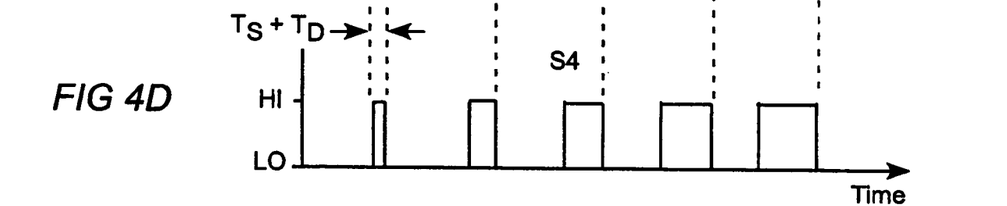
Figures 5A, 5B:
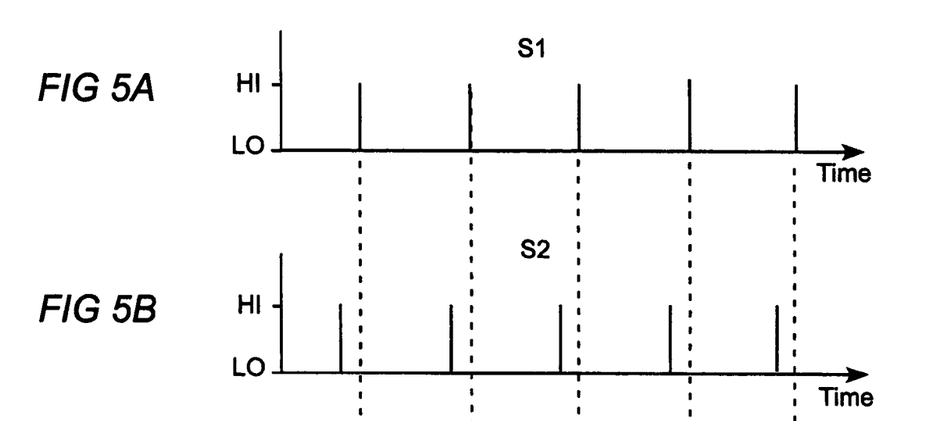
FIGS. 5A–D are timing diagrams indicating the form of output pulse trains from the flip-flop circuits of FIG. 3 in response to the flip-flop circuits receiving electronic pulse trains of the same frequency but different phase.
Figure 5C:
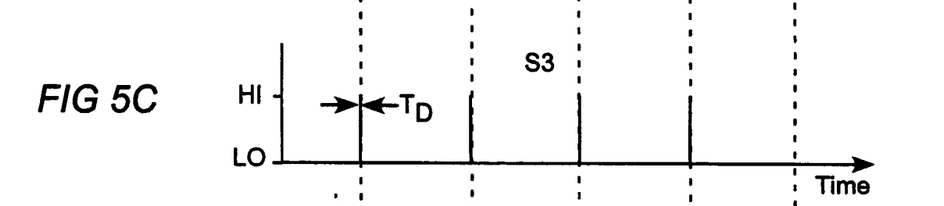
Figure 5D:
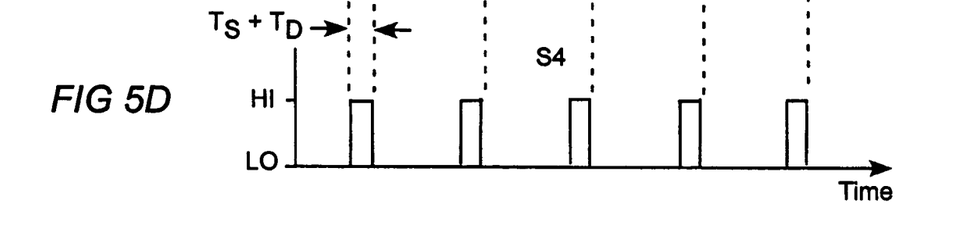

It should be noted here that in the case when signals S1 and S2 (and correspondingly S3 and S4) have different frequencies, the value of $T_S$ will vary with time and may vary periodically from zero and an entire period. In FIG. 4D this variation is greatly exaggerated for purposes of illustration.

FIGS. 5A–D are timing diagrams illustrating a case where signals S1 and S2 have the same frequency but are out of phase. Here, $T_S$ does not vary with time and V1 can be defined by an equation:

$$V1 = V_{logic} * f * Ts * G \quad (3)$$

where G is the gain of differential amplifier 80, and f is the common frequency of signals S1 and S2. Equation (3) is a reasonable approximation in most practical instances of phase difference between the master and slave signals.

The phase difference (phase), in degrees, is equal to the frequency times the slave lag or lead-time (Ts) divided by 360. Accordingly equation (3) can be rewritten as follows.

$$V1 = (Phase * V_{logic} * G)/360 \quad (4)$$

As the differential amplifier gain G and logic voltage $V_{logic}$ are set by design, the output V1 of digital phase detector 16 can be considered to be a variable representative only of the relative phase at photodiodes 56 and 58 of pulse trains emitted by lasers 12 and 14. A phase difference at any instant can be the result of a frequency difference, or a phase difference only. If the slave signal lags the master in phase, voltage S3 will be bigger than voltage S4. Accordingly the sign (positive or negative) of V3 can be used to determine whether the length of resonator 26 should be increased by galvanometer 28 or PZT 40.

In one preferred mode of operation of apparatus 10, lasers 12 and 14 are first closely matched in frequency, for example, to within about 1%, by manual adjustment of resonator mirror 22 in one or both of the lasers. Voltage V2 is set to zero, thereby making V3 equal to V1, and automatic synchronization in accordance with the present invention (minimizing V3, here, also minimizing V1) is implemented to equalize the frequency of pulse trains from the lasers and bring them in phase at photodiodes 56 and 58. V2 is then varied and V3 minimized by the inventive automatic resonator length adjustment until the pulse trains have the desired phase relationship on detector 51.

V2 can be set initially at some arbitrary value other than zero, and the frequency of the pulse trains matched without regard to their phase relationship. V2 may then be varied and V3 minimized until the desired phase relationship of the pulse trains at the detector is established. If V2 has been predetermined, it can be set before automatic frequency matching is initiated, and the desired phase relationship will be established when V3 is minimized by the automatic matching.

In "sweeping" the phase, after the pulse repetition frequency of the two lasers has been matched and V2 has been set to establish an initial phase relationship at the beginning of a sweep, say with pulses close to, but not actually overlapping, then V2 is progressively incremented (or decremented) to preferably pass though a full range of pulse overlap in response to an input signal (sweep signal) that can be delivered from data processing computer 90 or from a separate computer (not shown). The voltage increment is interpreted as an increment in phase, which in turn can be interpreted as an increment in time from the instantly established pulse-repetition frequency. This may be done by either phase controller 11, data processing computer 90, or even the separate computer, but the interpreted data must be made available to compute 90 for data processing.

Figure 6A:
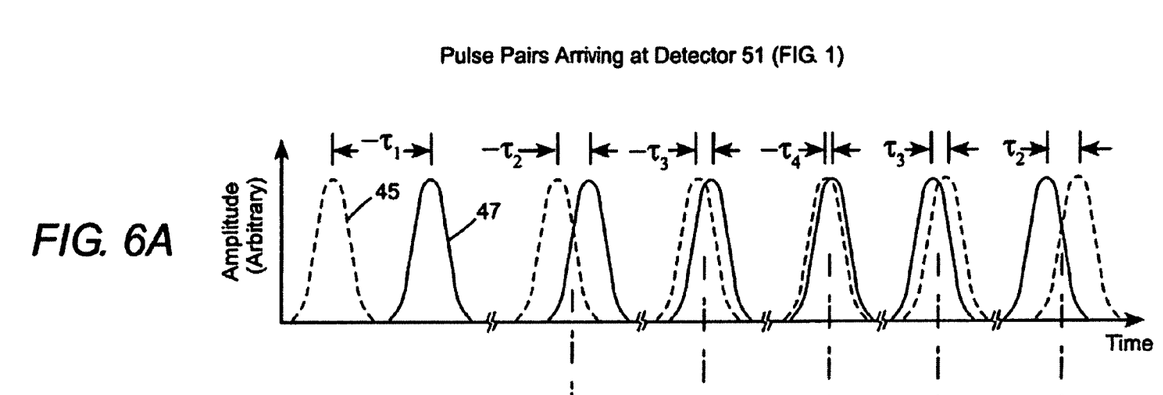
FIGS. 6A and 6B are graphs schematically illustrating temporally overlapping pulse pairs having different temporal separation at the detector of FIG. 1 and the response of the detector to the overlapping pulse pairs.
Figure 6B:
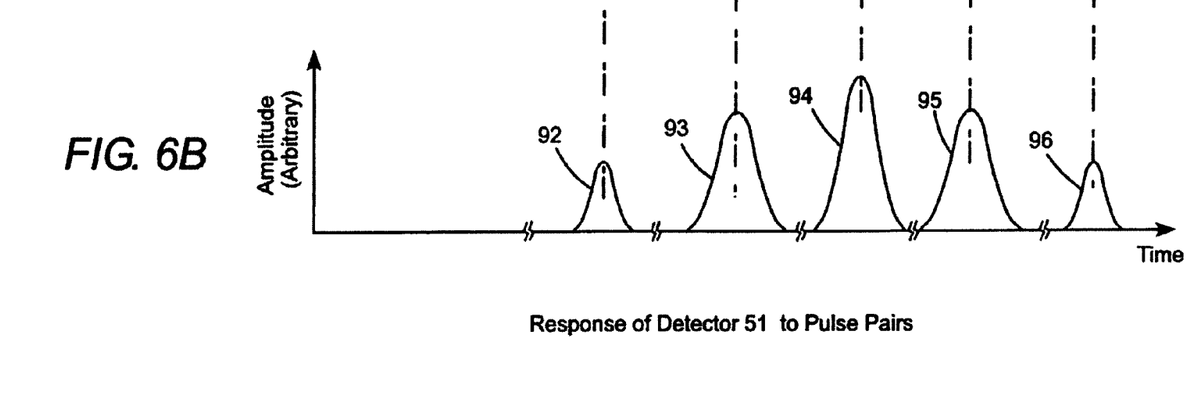

FIG. 6A and FIG. 6B are graphs schematically illustrating effects of temporal pulse overlap on the response of detector 51. In FIG. 6A pulses (out of the pulse trains) traveling on paths 45 and 47 are shown respectively as dashed and solid curves. In FIG. 6A, an initial pulse-pair has a phase difference (time separation) $-\tau_1$ (pulse 45 lagging in phase) produces no response in detector 51 (FIG. 6B). The phase and time separation is then incremented to provide pulse-pairs having separations $-\tau_2$, $-\tau_3$, $-\tau_4$, $\tau_3$, $\tau_2$. These pulse pairs produce responses 92, 93, 94, 95, and 96, respectively, in detector 51.

It should be noted here that it is not necessary that a phase increment be made for each successive pulses in each train of pulses. If incrementing is stopped, the output of detector 51 will repeat at essentially the same magnitude at the pulse repetition frequency of the trains and any one some fraction of all of these outputs can be sampled, collected, averaged, integrated, or otherwise manipulated for data processing. Accordingly, a set of data points representing a progressive overlapping of pulses can be collected over a much longer time than the range of temporal pulse overlap that it represents.

Figure 7:
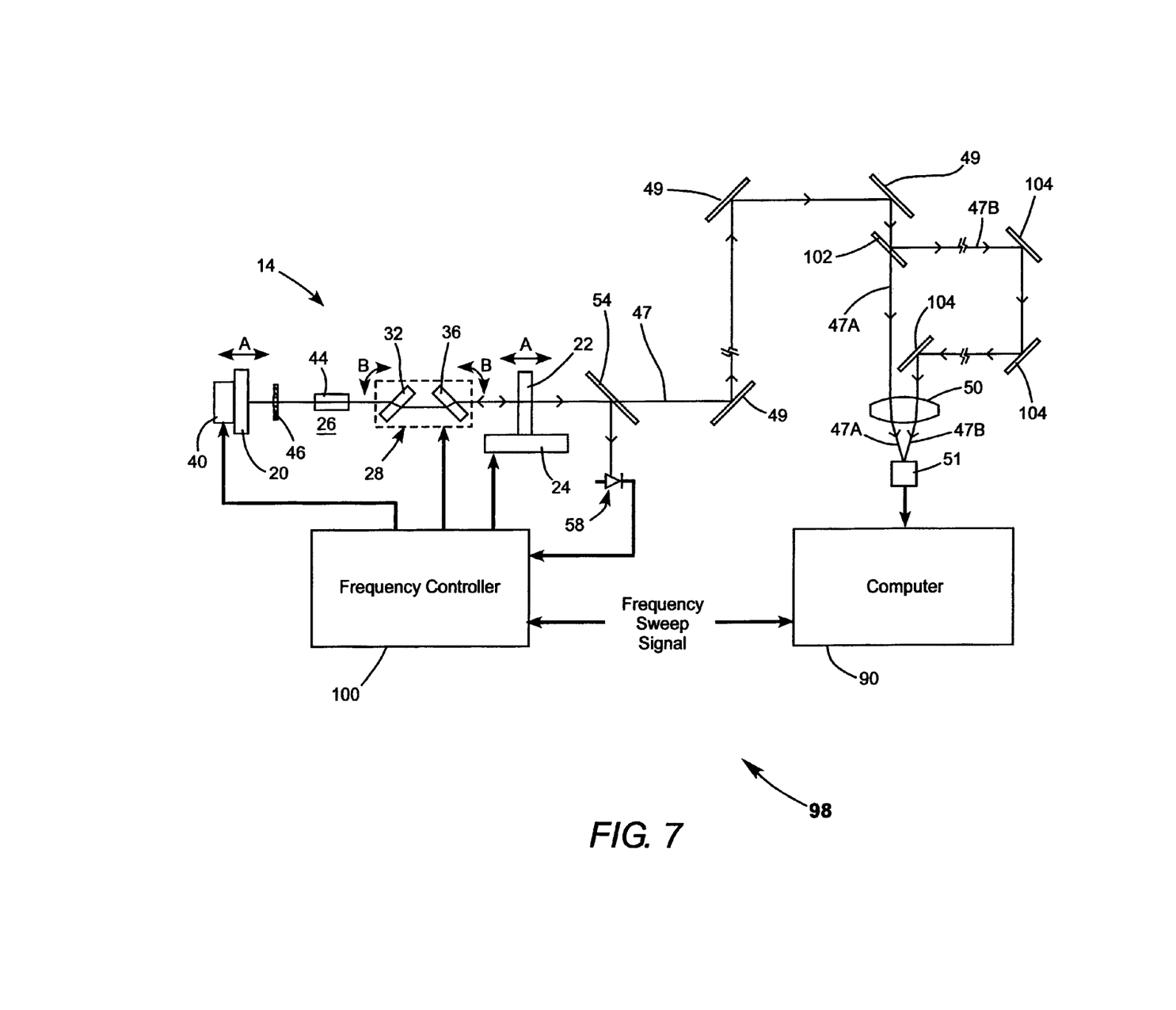
FIG. 7 schematically illustrates a preferred embodiment of apparatus for implementing an auto-correlation method in accordance with the present invention including only one repetitively pulsed laser, the pulses of which are divided into two components, with the components following paths of different length the and being directed to a single detector, the laser being provided with a frequency controller arranged to vary the pulse repetition frequency to varying temporal overlap of pulse components at the detector.

A preferred apparatus 98 for auto-correlation in accordance with the present invention is depicted n FIG. 7. Apparatus 98 includes only one repetitively pulsed, mode-locked ultrafast laser, here laser 14 is automatically adjustable as described above with reference to apparatus 10 of FIG. 1. A train of pulses (not explicitly shown) leaves laser 14 and travel along path 47 via turning mirrors 49. Each pulse in the train is optically divided into two component pulses by a beamsplitter 102. One component pulse travels a relatively short path 47A focused by lens 50 onto detector 51. The other component travels via an optical delay path 47B including turning mirrors 104 and focused by lens 50 onto detector 51. The difference in path length between paths 47A and 47B is about twice the longest length of resonator 26 of laser 14.

The difference in path length between paths 47A and 47B is selected such that, at a pulse repetition frequency within the available range of frequencies of laser 14, it is possible to exactly temporally overlap a delayed (path 47B) component of an Nth pulse in the train arriving at beamsplitter 102 on path 47 with an undelayed (path 46B) component of the (N+1)th, i.e., the next, pulse in the train. Then, with the delay path length fixed, as the pulse repetition frequency is increased or decreased then overlap of the pulse components will become less exact until there is not any pulse-overlap at all, and accordingly, not any response from detector 51.

An auto-correlation overlap-scan can be performed as described above for a cross-correlation scan with an exception that it is the pulse repetition frequency of the one laser (laser 14) that is scanned or swept (with the delay path 47B fixed) rather than the phase between two laser each providing a pulse train. The sweeping is controlled by a frequency sweep signal provided to a detector (photodiode) 58 and frequency controller 100 compares this with the frequency requested by the sweep signal and operates one or both of PZT 40 and device 28 to adjust the length of resonator 26 to establish the desired pulse repetition frequency. The length of the resonator can be varied continuously or incrementally as would be known to one of ordinary skill in the art.

Figure 8A:
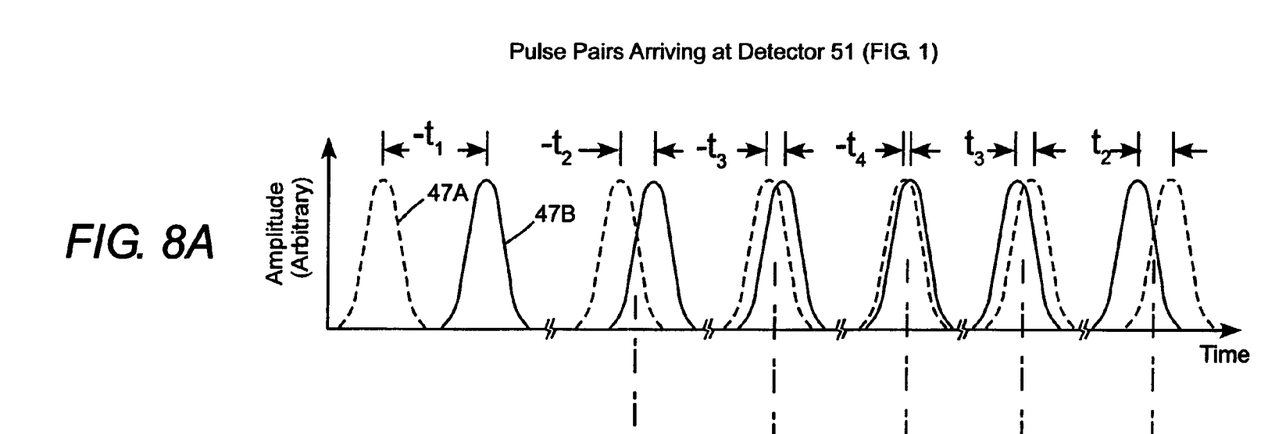
FIGS. 8A and 8B are graphs schematically illustrating temporally overlapping pulse components having different temporal separation at the detector of FIG. 7 and the response of the detector to the overlapping pulse components.
Figure 8B:
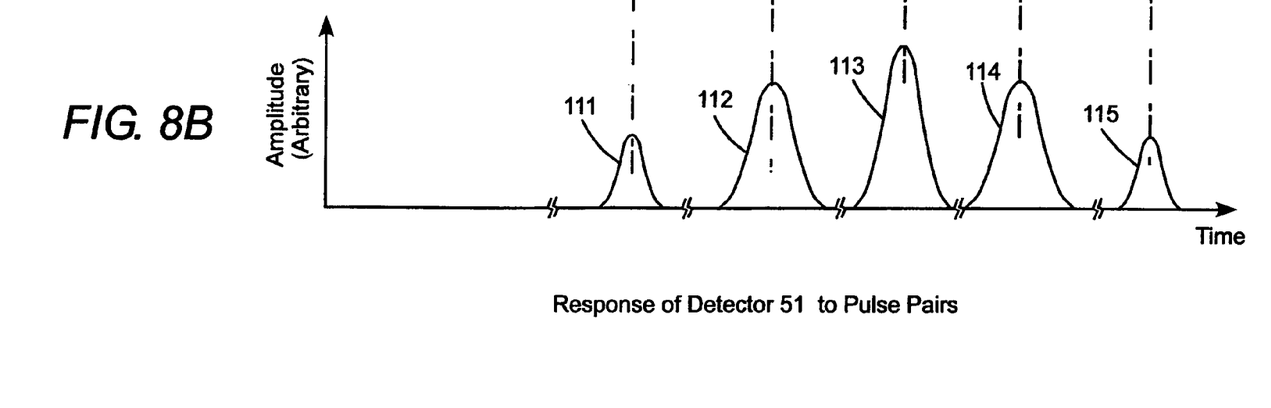

FIG. 8A and FIG. 8B are graphs schematically illustrating effects of temporal pulse-component overlap on the response of detector 51 resulting from a frequency sweep in apparatus 98. In FIG. 8A pulses (out of a pulse trains) traveling on paths 47A and 47B are shown respectively as dashed and solid curves. In FIG. 8A, an initial pulse-pair has a time separation $-\tau_1$ (pulse 45 lagging in phase) produces no response in detector 51 (FIG. 6B). The phase and time separation is then incremented to provide pulse-pairs having separations $-\tau_2$, $-\tau_3$, $-\tau_4$, $\tau_3$, $\tau_2$. These pulse pairs produce responses 111, 112, 113, 114, and 115, respectively, in detector 51. The pulse separation times, here are the differences between the pulse repetition interval at the instant frequency scan increment and the pulse repetition interval for the frequency at which the pulse components overlap.

Auto-correlation capability in apparatus 98 has an advantage over prior-art auto-correlation apparatus inasmuch as no physical scanning optical delay line including moving components is required. Absence of moving components provides that optical stability is achievable even in a relatively long delay line. In apparatus 98 a 10 Hz frequency sweep rate for a delay range of 10 picoseconds enables low noise data acquisition by avoiding low frequency noise as discussed above with reference to apparatus 10. It should be noted here that while path delay path 47B is described as being held fixed during a frequency scan, the path may be made selectively adjustable to allow it to be made compatible with a number of pulse-component overlap frequencies.

It should also be noted here that while cross-correlation apparatus 10 (FIG. 1) of is described herein with reference to preferred embodiment of a phase and frequency controller other configurations of phase and frequency controller may be used without departing from the spirit and scope of the invention. One other suitable controller for synchronizing the phase and frequency of two lasers is a model Synchrolock™ AP™ available from Coherent Inc. of Santa Clara, Calif. Relatively simple servo loops only are required to control only frequency as in apparatus 98 of FIG. 7. Accordingly, a detailed description of frequency controller 100 is not presented herein.

The present invention is described and depicted herein in terms of a preferred and other embodiments. The invention, however, is not limited to the embodiments described and depicted. Rather, the invention is limited only by the claims appended hereto.

What is claimed is:

1. A cross-correlation method for laser pulses, comprising:
    (a) providing first and second repetitively pulsed laser resonators delivering first and second pulse trains at respectively first and second pulse repetition frequencies;
    (b) directing said pulse trains to spatially overlap on a detector, said detector providing a response when a pulse of said first pulse train temporally overlaps a pulse of said second pulse train, said detector response having a magnitude dependent on the degree of temporal overlap of said pulses;
    (c) varying the optical length of said first laser resonator to change said temporal overlap between the pulses; and
    (d) during step (c) recording the magnitude of the response of said detector at a plurality of different degrees of temporal overlap of the pulses.

2. The method of claim 1, wherein in step (d) the degree of temporal overlap of the pulses is recorded together with the magnitude of the response at each degree of temporal overlap.

3. The method of claim 2, wherein said degree of temporal overlap is recorded as one of phase and time.

4. The method of claim 1, wherein said resonator length is varied continuously.

5. The method of claim 1, wherein said resonator length is varied incrementally.

6. The method of claim 1, wherein said detector is a two-photon detector.

7. The method of claim 1, wherein said first and second pulse repetition frequencies are equal.

8. A cross-correlation method for laser pulses, comprising:
    (a) providing first and second repetitively pulsed laser resonators delivering first and second pulse trains at respectively first and second pulse repetition frequencies;
    (b) directing said pulse trains to spatially overlap on a detector, said detector providing a response when a pulse of said first pulse train temporally overlaps a pulse of said second pulse train, said detector response having a magnitude dependent on the degree of temporal overlap of said pulses;
    (c) varying the length of said first laser resonator until said first and second pulse repetition frequencies are equal;
    (d) following step (c) varying the length of said first laser resonator to change said temporal overlap between the pulses; and (e) during step (d) recording the magnitude of the response of said detector at a plurality of different degrees of temporal overlap of the pulses.

9. The method of claim 8, wherein in step (e) the degree of temporal overlap of the pulses is recorded together with the magnitude of the response at each degree of temporal overlap.

10. The method of claim 9, wherein said degree of temporal overlap is recorded as one of phase and time.

11. The method of claim 8, wherein in step (c) said laser resonator length is further varied such that said first and second pulse trains have a predetermined phase relationship with each other.

12. An auto-correlation method for laser pulses, comprising:
   (a) providing a repetitively pulsed laser resonator delivering a train of pulses having a pulse repetition frequency, said pulse repetition frequency being selectively variable;
   (b) optically dividing each pulse of said pulse train into first and second pulse components;
   (c) directing said first and second pulse components along first and second paths onto a detector, said second path being longer than said first path, said detector providing a response when a said first pulse component temporally overlaps a said second pulse component on said detector, said detector response having a magnitude dependent on the degree of temporal overlap of said pulse components and;
   (d) varying said pulse-repetition frequency to change said temporal overlap between said pulse components; and
   (e) during step (d) recording the magnitude of the response of said detector at a plurality of different degrees of temporal overlap of the pulses.

13. The method of claim 12, wherein in step (e) the degree of temporal overlap of said pulse components is recorded together with the magnitude of the response at each degree of temporal overlap.

14. The method of claim 12, wherein, in step (d), said pulse-repetition frequency is varied by varying the optical length of said laser resonator.

15. An auto-correlation method for laser pulses, comprising:
   (a) providing a repetitively pulsed laser resonator delivering a train of pulses having a pulse repetition frequency, said pulse repetition frequency being selectively variable;
   (b) optically dividing each pulse of said pulse train into first and second pulse components;
   (c) directing said first and second pulse components along first and second paths onto a detector, said second path being longer than said first path, said detector providing a response when a said first pulse component temporally overlaps a said second pulse component on said detector, said detector response having a magnitude dependent on the degree of temporal overlap of said pulse components and;
   (d) varying said pulse-repetition frequency to change said temporal overlap between said pulse components; and
   (e) during step (d) recording the magnitude of the response of said detector at a plurality of different degrees of temporal overlap of the pulses,
   wherein said difference between said first and second paths is about equal to twice the optical length of said laser resonator.

16. The method of claim 14, wherein the second pulse component of an Nth pulse in said pulse train temporally overlaps the first component of the (N+1)th pulse in said pulse train.

17. The method of claim 12, wherein in step (d) said frequency is varied incrementally.

* * * * *